US009829026B2

(12) United States Patent
Andou et al.

(10) Patent No.: US 9,829,026 B2
(45) Date of Patent: Nov. 28, 2017

(54) ANCHOR BOLT (71) Applicant: HOWA CORPORATION, Amagasaki-shi, Hyogo (JP)

(72) Inventors: Kazuaki Andou, Amagasaki (JP); Toru Yanai, Amagasaki (JP)

(73) Assignee: HOWA CORPORATION, Amagasaki-Shi, Hyogo (JP)

( * ) Notice: Subject to any disclaimer, the term of this patent is extended or adjusted under 35 U.S.C. 154(b) by 0 days.

(21) Appl. No.: 14/908,700

(22) PCT Filed: Jan. 24, 2014

(86) PCT No.: PCT/JP2014/051551
§ 371 (c)(1),
(2) Date: Jan. 29, 2016

(87) PCT Pub. No.: WO2015/019629
PCT Pub. Date: Feb. 12, 2015

(65) Prior Publication Data
US 2016/0215805 A1 Jul. 28, 2016

(30) Foreign Application Priority Data

Aug. 8, 2013 (JP) .................................. 2013-165384
Sep. 13, 2013 (JP) .................................. 2013-190807

(51) Int. Cl.
F16B 37/04 (2006.01)
F16B 13/06 (2006.01)
(52) U.S. Cl.
CPC .................................. F16B 13/065 (2013.01)
(58) Field of Classification Search
CPC .................................................... F16B 13/065
(Continued)

(56) References Cited

U.S. PATENT DOCUMENTS 1,278,025 A * 9/1918 Salmons ............... F16B 13/065
411/32
1,753,183 A * 4/1930 Johnson .............. B60B 33/0002
16/19

(Continued)

FOREIGN PATENT DOCUMENTS

CA        1039986      10/1978
JP        46-876       9/1971

(Continued)

OTHER PUBLICATIONS

Chinese Office Action dated Dec. 16, 2016.
(Continued)

Primary Examiner — Gary Estremsky
(74) Attorney, Agent, or Firm — Baker & Hostetler LLP (57) ABSTRACT An anchor bolt which is surely fixed to, for example, a rock wall and is easy to carry and store is provided. The anchor bolt according to the present invention has expandable devices (5) which are disposed at three locations of a rod (3). When the anchor bolt is inserted into a bore (2), a free end of an abutment part (16) of the expandable device (5) abuts an inner peripheral surface (26) of the bore (2), and expandable members (13) are held in the bore (2). In this state, when a taper member (12) is moved toward a base end of the anchor bolt along with the rod (3), an inclined surface (15) of the taper member (12) surface-contacts an inner surface (19) of the abutment part (16), and an outer peripheral surface (20) of the abutment part (16) is pressed against an inner peripheral surface 26 of the bore (2).

9 Claims, 6 Drawing Sheets (58) Field of Classification Search
USPC ....... 411/24, 32, 33, 47, 67, 60.3; 405/259.4
See application file for complete search history.

(56) References Cited

U.S. PATENT DOCUMENTS

| | | | | |
|---|---|---|---|---|
| 2,753,750 A * | 7/1956 | Dempsey | ............... | E21D 21/008 411/67 |
| 2,787,931 A | 4/1957 | McCabe | | |
| 2,972,495 A * | 2/1961 | Yalen | ....................... | F16B 7/025 108/158.11 |
| 3,188,815 A * | 6/1965 | Novotny | ................. | E21D 20/02 405/259.4 |
| 3,216,304 A | 11/1965 | James et al. | | |
| 3,469,407 A * | 9/1969 | Kovacs | ................. | E21D 21/008 405/259.1 |
| 3,522,755 A | 8/1970 | Michell | | |
| 3,620,120 A * | 11/1971 | Warner | ................. | E21D 21/008 411/51 |
| 3,695,045 A | 10/1972 | Williams | | |
| 3,884,099 A | 5/1975 | Sikstrom | | |
| 4,516,886 A * | 5/1985 | Wright | ................. | E21D 20/025 405/259.3 |
| 4,534,680 A * | 8/1985 | White | ................... | E21D 20/025 405/259.3 |
| 4,704,053 A * | 11/1987 | Hipkins, Sr. | ............ | E21D 20/02 405/259.1 |
| 5,009,549 A * | 4/1991 | Stankus | ................ | E21D 20/025 405/259.4 |
| 5,501,551 A * | 3/1996 | Wright | .................. | E21D 21/008 405/259.4 |
| 2006/0263167 A1 | 11/2006 | Linka et al. | | |

FOREIGN PATENT DOCUMENTS

| | | |
|---|---|---|
| JP | 49-14855 | 2/1974 |
| JP | 54-159553 | 12/1979 |
| JP | 61-278609 | 12/1986 |
| JP | 8-74823 | 3/1996 |
| JP | 10-318223 | 12/1998 |
| JP | 2006-526121 | 11/2006 |

OTHER PUBLICATIONS

International Search Report issued in International Patent Application No. PCT/JP2014/051551 dated Apr. 28, 2014.
European Search Report issued in European Patent Application No. 14834014.4 dated Mar. 9, 2017.

* cited by examiner

ANCHOR BOLT

REFERENCE TO RELATED APPLICATIONS

This application is the U.S. national stage of International Application No. PCT/JP2014/051551, filed Jan. 24, 2014, and claims the priority of Japanese Patent Application No. 2013-165384, filed Aug. 8, 2013, and Japanese Patent Application No. 2013-190807, filed Sep. 13, 2013, the disclosures of which are all incorporated herein by reference in their entirety.

TECHNICAL FIELD

The present invention relates to an anchor bolt which is fixed in a bore provided, for example, in a rock wall or a concrete wall.

BACKGROUND ART

For example, as described in the Patent Publication 1, an anchor bolt inserted into and then fixed in a bore which is bored in a rock wall and so on with a drill and so on.

Specifically, in the anchor bolt described in the Patent Publication 1, a C-shaped shell with an inner surface inclined so as to define a cone surface is engaged with a peripheral surface of a cone member whose diameter becomes large as it comes closer to a tip end surface of the cone member (rightward in FIG. 2 in the Patent Publication 1). Further, an external thread formed on a rod is threadably engaged with an internal thread formed along a central axis of the cone member.

Then, after the anchor bolt is inserted into a bore which is bored, for example, in a rock wall, the rod is turned to apply a pulling force to the cone member in a direction of removing the rod from the bore. Thus, the cone member is moved toward an opening of the bore (leftward in FIG. 2 in the Patent Publication 1), a peripheral surface of the cone member pushes the shell toward an inner surface of the bore, and an outer peripheral surface of the shell is pressed against the inner peripheral surface of the bore, so that the anchor bolt is held (fixed), for example, in a rock wall.

PRIOR ART PUBLICATION

Patent Publication 1: Japanese Patent Laid-open Publication No. S54-159553

SUMMARY OF THE INVENTION

Problem to be Solved by the Invention

In the anchor bolt described in the Patent Publication 1, since the shell is disposed only at a tip of the rod and the anchor bolt is fixed to, for example, a rock wall only by one shell, the fixation of the anchor bolt may not be sufficiently done.

Further, since there is a gap between the shell and the inner peripheral surface of the bore when the anchor bolt is inserted into the bore (see FIG. 2 in the Patent Publication 1), when the rod is turned, the cone member and the shell follow the rod to be turned and the shell cannot be properly pressed by the peripheral surface of the cone member so that the anchor bolt may not be surely fixed to, for example, a rock wall.

Further, in the anchor bolt described in the Patent Publication 1, the rod may be long, for example, for some purpose of use, and if this is the case, it would not be easy to carry and store the rod.

Further, in the anchor bolt described in Patent Publication 1, an edge of the tip (right side in FIG. 2 in the Patent Publication 1) of the cone member is formed with an acute angle so that the tip becomes thin as it comes closer to the edge. Thus; as stated above, when the cone member is moved toward the opening of the bore, the edge of the cone member is possibly deflected toward a back of the bore due to friction with the inner peripheral surface of the shell. The stress of the cone member make the peripheral surface of the tip of the cone member difficult to properly contact the inner peripheral surface of the shell and the shell cannot be sufficiently pressed toward the inner peripheral surface of the bore by the cone member so that the anchor bolt may not be firmly fixed to, for example, the rock wall.

The present invention has been made for the purpose of overcoming the above-stated inconvenience and provides an anchor bolt which is surely fixed to, for example, a rock wall.

The present invention has been made for the purpose of overcoming the inconvenience and provides an anchor bolt which is surely fixed to, for example, a rock wall and is easy to carry and store.

Means for Solving the Problem

In order to overcome the above-stated inconvenience, the present invention is directed to an anchor bolt fixed in a bore 2 provided in a wall surface 1, comprising: a cylindrical rod 3; and expandable devices 5 disposed at at least two locations along a longitudinal direction of the rod 3 for fixing the anchor bolt on an inner peripheral surface 26 of the bore 2; wherein the rod 3 is divided into a plurality of rod pieces 3a, 3b, 3c, 3d, each rod piece 3a, 3b, 3c, 3d having an external thread 6 on at least a portion along a longitudinal direction of the rod piece 3a, 3b, 3c, 3d, wherein the rod pieces 3a, 3b, 3c, 3d are coupled to each other with a joint 8, wherein each expandable device 5 has a taper member 12 and an expandable member 13 fitted over the taper member 12, the taper member 12 has an internal thread 11 formed along a central axis of the taper member 12 for being threadably engaged with an external thread 6 of the rod 3, and a plurality of inclined surfaces 15 of an outer peripheral surface of the taper member 12, wherein the expandable member 13 has a plurality of abutment parts 16 and a bridge 17 connecting tips of the abutment parts 16 with each other, the abutment part 16 having an inner surface 19 which can surface-contact the inclined surface 15 of the taper member 12, wherein each inclined surface 15 of the taper member 12 is inclined so as to come closer to the central axis of the taper member 12 toward a base end of the anchor bolt, wherein the abutment part 16 of the expandable member 13 is configured to go away from the rod 3 toward a free end of the abutment part 16, wherein when the anchor bolt is inserted from its tip into the bore 2, the expandable member 13 is inserted into the bore 2 in an elastically deformed state and the free end of the abutment part 16 is pushed against the inner peripheral surface 26 of the bore 2, and wherein that when in this state of the expandable member 13, the taper member 12 is moved toward the base end of the anchor bolt, the inclined surface 15 of the taper member 12 surface-contacts the inner surface 19 of the abutment part 16, and an outer peripheral surface 20 of the abutment part 16 is pushed against the inner peripheral surface 26 of the bore 2.

The wall surface 1 includes a wall surface of, for example, a ceiling and a side wall of a civil engineering structure, such as a tunnel, and an architectural structure, a rock wall, and so on. The external thread 6 of each rod piece 3a, 3b, 3c, 3d includes kinds of the external threads 6 which may be formed entirely in a longitudinal direction of the rod piece 3a, 3b, 3c, 3d, or only at ends in the longitudinal direction of the rod piece 3a, 3b, 3c, 3d. Even if the external thread 6 is formed only at the ends of the rod piece 3a, 3b, 3c, 3d, the external thread 6 has a length to maintain a state of being threadably engaged with the internal thread 11 of the taper member 12. The expandable device 5 may not be disposed at all rod pieces 3a, 3b, 3c, 3d.

The rod 3 may be pulled toward the base end of the bore 2 to move the taper member 12 toward the base end of the anchor bolt, or the rod 3 may be turned with the action of screw to move the taper member 12 toward the base end of the anchor bolt. The more the number of the abutment part 16 of the expandable member 13 is, the larger the contact areas between the outer peripheral surface 20 of the abutment part 16 and the inner peripheral surface 26 of the bore 2 can be, but the more complicated the structure of the anchor bolt becomes, and thus, the number of the abutment part 16 should be set, taking into consideration the contact area and the structure of the anchor bolt. It is preferable that the bridge 17 of the expandable member 13 is provided with an aperture 21 through which the rod 3 passes in order to dispose the expandable device 5 at the intermediate location in a longitudinal direction of the rod 3.

Further, the rod piece 3b, 3c may be provided with cutout 22 for being engaged with a tool.

Further, in order to overcome the above-stated inconvenience, an anchor bolt according to the present invention is fixed in a bore 2 provided in a wall surface 1 and comprises: a cylindrical rod 3 having on its outer peripheral surface an external thread 6, and expandable devices 5 disposed at at least two locations along a longitudinal direction of the rod 3 for fixing the anchor bolt on an inner peripheral surface 26 of the bore 2, wherein each expandable device 5 has a taper member 12 and an expandable member 13 fitted over the taper member 12, and the taper member 12 has an internal thread 11 formed along a central axis of the taper member 12 for being threadably engaged with the external thread 6 of the rod 3 and a plurality of planar inclined surfaces 15 of an outer peripheral surface of the taper member 12; wherein the expandable member 13 has a plurality of abutment parts 16 and a bridge 17 connecting tips of the abutment parts 16 with each other, the abutment part 16 having a planar inner surface 19 which can surface-contact the inclined surface 15 of the taper member 12, wherein each inclined surface 15 of the taper member 12 is inclined so as to come closer to the central axis of the taper member 12 toward a base end of the anchor bolt, wherein a tip peripheral surface 14 which is located at a tip of the taper member 12 and at least nearer the tip than the inclined surface 15 is configured as an upright surface along the central axis of the taper member 12, and wherein when the taper member 12 is moved toward a base end of the bore 2 in a state in which the anchor bolt is inserted into the bore 2, the inclined surface 15 of the taper member 12 is surface-pressed against the inner surface 19 of the abutment part 16 and an outer peripheral surface 20 of the abutment part 16 is pressed against the inner peripheral surface 26 of the bore 2.

The wall surface 1 include a wall surface of, for example a ceiling and a side wall of a civil engineering structure, such as a tunnel, and an architectural structure, a rock wall, and so on. Further, the rod 3 may be pulled toward the base end of the bore 2 to move the taper member 12 toward the base end of the bore 2, or the rod 3 may be turned with the action of screw to move the taper member 12 toward the base end of the bore 2. The more the number of the abutment part 16 of the expandable member 13 is, the larger the contact area between the outer peripheral surface 20 of the abutment part 16 and the inner peripheral surface 26 of the bore 2 can be, but the more complicated the structure of the anchor bolt becomes, and thus, the number of the abutment part 16 should be set, for example, as four, taking into consideration the contact area and the structure of the anchor bolt. It is preferable that the bridge 17 of the expandable member 13 is provided with an aperture 21 through which the rod 3 passes in order to dispose the expandable device 5 at the intermediate location of the rod 3.

In the tip of the taper member 12, only on at least a tip side with respect to the inclined surface 15 may be a perpendicular surface, and the entire tip of the taper member 12 may be a prismatic column or a cylinder. Regarding the tip peripheral surface 14 of the taper member 12, if the longitudinal size of the taper member 12 is too large, the contact area between the inclined surface 15 of the taper member 12 and the inner surface 19 of the abutment part 16 would become too small, and if the longitudinal size of the tip peripheral surface 14 is too small, the effect of restricting the edge of the tip of the taper member 12 from being deflected would be reduced, and thus, considering this matter, the size of the tip peripheral surface 14 would be set. The size of the tip peripheral surface 14 in the longitudinal direction is set, for example, within a range of 1-10 mm. It is preferable that the entire outer peripheral surface 20 of the abutment part 16 is pressed against the inner peripheral surface 26 of the bore 2 in the surface-contact state, but the entire outer peripheral surface does not necessarily surface-contact it.

The rod 3 is divided into a plurality of rod pieces 3a, 3b, 3c, 3d, each rod piece 3a, 3b, 3c, 3d has an external thread 6 on at least a portion along a longitudinal direction of the rod piece 3a, 3b, 3c, 3d, the rod pieces 3a, 3b, 3c, 3d are coupled to each other with a joint 8, and the external threads 6 of at least two 3a, 3b, 3c of the rod pieces 3a, 3b, 3c, 3d are threadably engaged with the taper members 12 of the respective expandable devices 5.

The external thread 6 of each rod piece 3a, 3b, 3c, 3d includes kinds of the external threads 6 which may be formed entirely in a longitudinal direction of the rod piece 3a, 3b, 3c, 3d or only at ends in the longitudinal direction of the rod piece 3a, 3b, 3c, 3d. Even if the external thread 6 is formed only at the ends of the rod piece 3a, 3b, 3c, 3d, the external thread 6 has a length to maintain a state of being threadably engaged with the internal thread 11 of the taper member 12. The expandable devices 5 may not be disposed at all rod pieces 3a, 3b, 3c, 3d. The joint 8 includes kinds of the joints 8 which may have an internal thread being threadably engaged with the external thread 8 of the rod piece 3a, 3b, 3c, 3d, or may have a cutout to which a protrusion formed on the outer peripheral surface of the rod piece 3a, 3b, 3c, 3d is caught to hold the rod piece 3a, 3b, 3c, 3d.

The abutment part 16 of the expandable member 13 is configured to go away from the rod 3 toward a free end of the abutment part 16, and when the anchor bolt is inserted into the bore 2, the expandable member 13 is inserted into the bore 2 in an elastically deformed state, and the elastic recovery force allows the free end of the abutment part 16 to be pushed against the inner peripheral surface 26 of the bore 2.

Further, the bridge 17 consists of a main body 17a located at a tip of the expandable device 5, and a plurality of connecting parts 17b connecting the main body 17a to the tip of each abutment part 16, the main body 17a and the connecting parts 17b are integrally formed, and at least each connecting part 17b of the bridge 17 is elastically deformable. In this case, the bridge 17 may allow the free end of the abutment part 16 to be properly pushed against the inner peripheral surface 26 of the bore 2 due to the elastic recovery force of the bridge 17 when the anchor bolt is inserted into the bore 2, and have an elastic property to maintain a position of the free end of the abutment part 16 away from the rod 3 before the anchor bolt is inserted into the bore 2.

In the anchor bolt according to the present invention, since the abutment part 16 of the expandable member 13 goes away from the rod toward the free end of the abutment part 16, when the anchor bolt is inserted into the bore 2, the expandable member 13 is elastically deformed, the free end of the abutment part 13 of the expandable member 13 is inserted into the bore 2 in a state of coming closer to the rod 3, and due to the elastically recovery force, the free end of the abutment part 16 is pushed against the inner peripheral surface 26 of the bore 2. In this state, when the taper member 12 is moved toward the base end of the bore 2 (anchor bolt), the free end of the abutment part 16 is caught (held) by the inner peripheral surface 26 of the bore 2, and the expandable member 13 is restricted from being moved toward the base end of the anchor bolt along with the taper member 12, for example, to be removed from the bore 2. Further, since the abutment part 16 is held on the inner peripheral surface 26 of the bore 2, an effect of restricting the taper member 12 from following the turning of the rod 3 can be obtained.

Thus, when the taper member 12 is moved toward the base end of the anchor bolt, the inclined surface 15 of the taper member 12 can be firmly pressed against the inner surface 19 of the abutment part 16. As a result, the abutment part 16 is surely pushed toward the inner peripheral surface 28 of the bore 2 by the taper member 12, the outer peripheral surface 20 of the abutment part 16 is pressed against the inner peripheral surface 26 of the bore 2 in a surface-pressed or surface-contact state, and the friction between surfaces, namely, the outer peripheral surface 20 of the abutment part 16 and the inner peripheral surface 26 of the bore 2, allows the anchor bolt to be surely fixed in the bore 2.

In the anchor bolt according to the present invention, since a plurality of expandable devices 5 are inserted into the bore 2 along with the rod 3, contact areas between the outer peripheral surface 20 of the abutment part 16 of the expandable member 13 of the expandable device 5 and the inner peripheral surface 26 of the bore 2 can be increased more than an anchor bolt in which only one expandable device 5 is disposed on the rod 3, and to the extent of this, the anchor bolt can be firmly fixed in the bore 2.

Since the rod 3 consists of the plurality of divided rod pieces 3a, 3b, 3c, 3d, the rod pieces 3a, 3b, 3c, 3d can be carried and stored in the divided state, and convenience in carry and store can be enhanced. Further, since a length of the rod 3 can be adjusted by appropriately combining the rod pieces 3a, 3b, 3c, 3d, it is not necessary for preparing a plurality of kinds of rods 3 with different lengths, and to the extent of this, time and efforts for management of the anchor bolt can be reduced.

If the rod piece 3b, 3c is provided with cutouts for engaging a tool, when the rod pieces 3a, 3b, 3c, 3d are coupled to each other with the joints 8, in a state in which a tool is engaged with the cutout 22 of one rod piece and the one rod piece is held by the tool.

Further, in the anchor bolt according to the present invention, since the planar inclined surface 15 of the taper member 12 and the planar inner surface 19 of the abutment part 16 of the expandable member 13 surface-contact each other, the taper member 12 is restricted from relatively turning in a circumferential direction with respect to the abutment part 16.

Thus, in the state in which the abutment part 16 is held on the inner peripheral surface 26 of the abutment part 16 due to the insertion of the anchor bolt into the bore 2, even if, for example, the rod 3 is turned, the taper member 12 is restricted from following the turning of the rod by the abutment part 16. Thus, by turning the rod 3, the taper member 12 can be surely moved toward the base end of the bore due to the screw action, the inclined surface 15 of the taper member 12 is properly surface-pressed against the inner surface 19 of the abutment part 16, and the outer peripheral surface 20 of the abutment part 16 can be firmly pressed against the inner peripheral surface 26 of the bore in a surface-contact state. As a result, the anchor bolt can be fixed (held) in the bore 2 due to friction between surfaces, namely, the outer peripheral surface 20 of the abutment part 16 and the inner peripheral surface 26 of the bore 2.

Further, since the tip peripheral surface 14 of the taper member 12 is formed as an upright surface along the central axis of the taper member 12, the tip of the taper member 12 is difficult to contact the inner surface 19 of the abutment part 16 and does not become thin largely. Thus, even if the taper member 12 and the inner surface 19 of the abutment part 16 are frictioned each other by the movement of the taper member 12 toward the base end of the bore 2 (anchor bolt), the edge portion of the tip of the taper member 12 is restricted from deflecting toward the back of the bore 2 (toward tip of the anchor bolt). To the extent of this, the stress (deformation) of the taper member 12 is restricted, the inclined surface 15 of the taper member 12 is properly surface-pressed against the inner surface 19 of the abutment part 16, the abutment part 16 is properly pushed toward the inner peripheral surface 26 of the bore 2, and the taper member 12 can surely push the abutment part 16 toward the inner peripheral surface 26 of the bore 2, so that the anchor bolt can be surely fixed, for example, to a rock wall.

When the main body 17a and each connecting part 17b of the bridge 17 are integrally formed and at least each connecting part 17b of the bridge 17 is elastically deformable, the bridge 17 can be made more easily than a bridge in which the main body 17a and each connecting part 17b are formed separately. Further, since at least the connecting parts 17b for connecting the abutment part 16 is elastically deformable, the abutment part 16 can be surely come close toward the rod 3, even if the abutment part 17b is formed of, for example, a material which is difficult to be deformed.

DESCRIPTION OF EMBODIMENTS

An embodiment of an anchor bolt according to the present invention will be explained based on FIGS. 1-5. The anchor bolt according to the present invention is configured to be inserted into and fixed (held) in a bore 2 bored (provided), for example, in a wall surface 1 (FIG. 4) of a concrete ceiling (a state shown in FIG. 5).

Figure 1:
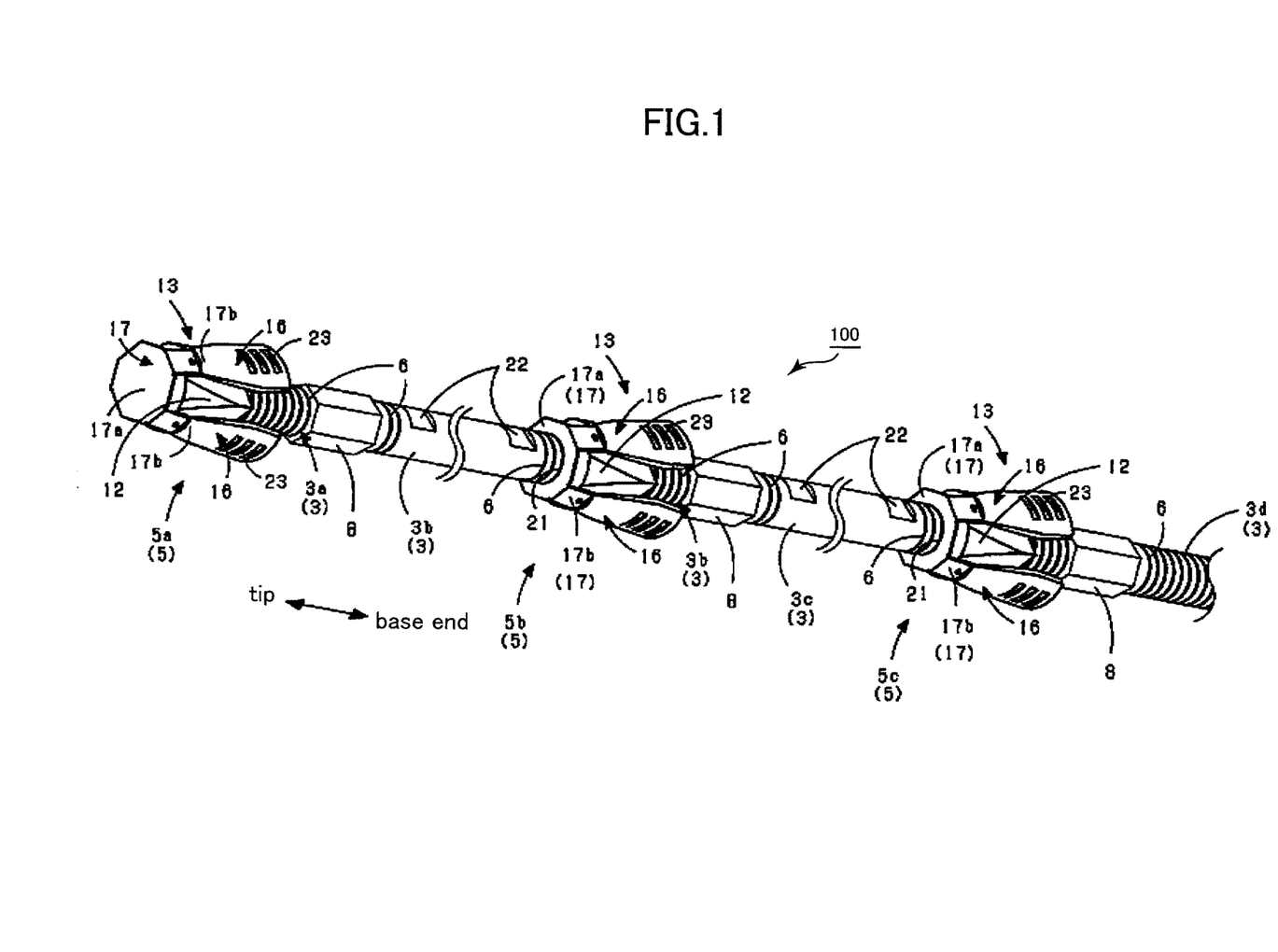
FIG. 1 is a perspective view showing a first embodiment of an anchor bolt according to the present invention.

As shown in FIG. 1, the anchor bolt has, at a tip (left end in FIG. 1) of a cylindrical rod 3 and at two intermediate locations along a longitudinal direction (left-right direction in FIG. 1) of the rod 3, respective expandable devices 5 for fixing the anchor bolt on an inner peripheral surface 26 of the bore 2, which is a cylindrical surface.

Figure 4:
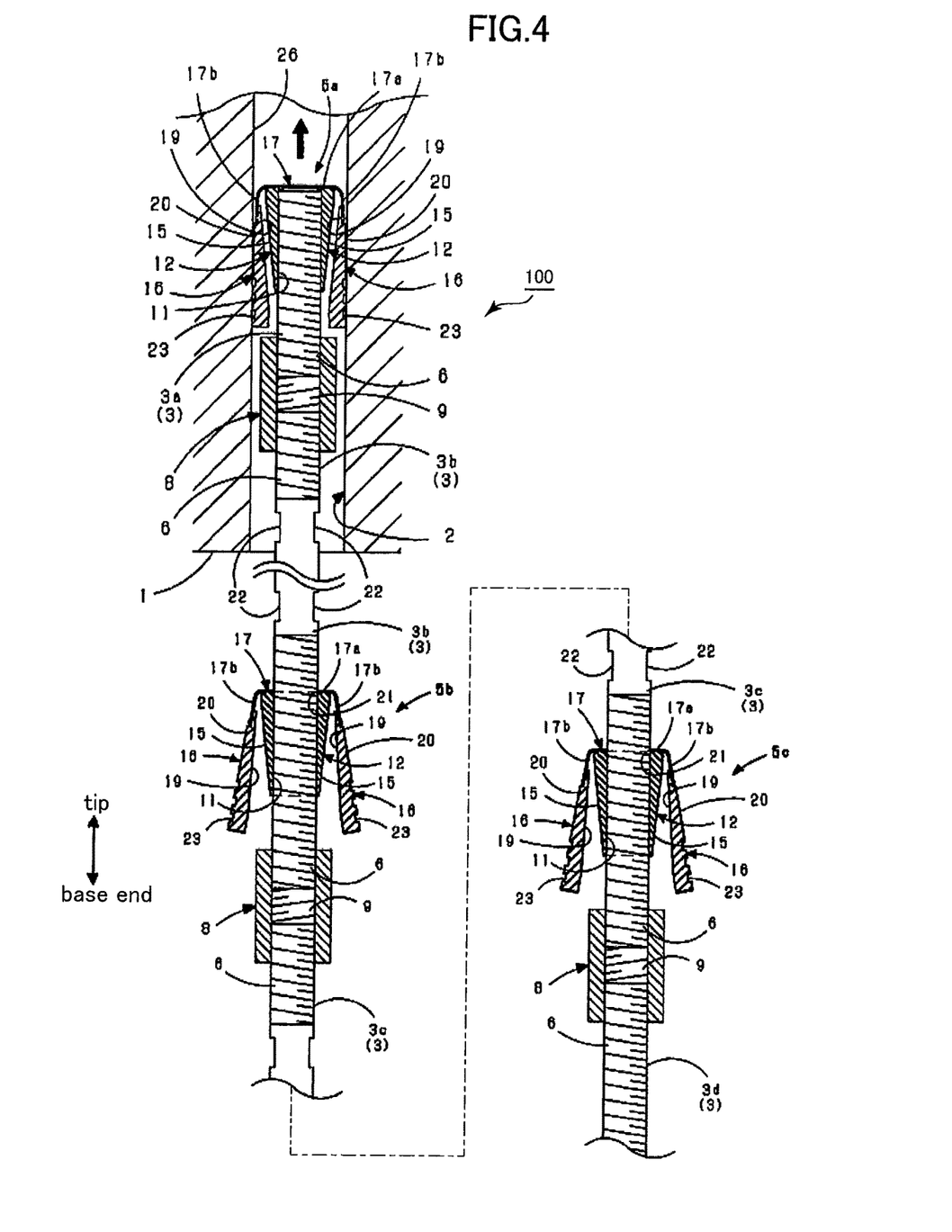
FIG. 4 is a longitudinal cross-sectional view of the first embodiment of the anchor bolt according to the present invention, for explaining a procedure of attaching the anchor bolt in a bore.

As shown in FIGS. 1 and 4, the rod 3 is divided into four cylindrical rod pieces 3a, 3b, 3c, 3d, and a tip rod piece 3a located nearest a tip (left end in FIG. 1) of the anchor bolt and a base-end rod piece 3d located nearest a base end (right end in FIG. 1) of the anchor bolt have external threads 6 entirely along their longitudinal directions (up-down direction in FIG. 4).

Two intermediate rod pieces 3b, 3c located intermediate of the rod 3 have external threads 6 located at the opposite ends in their longitudinal directions (up-down direction in FIG. 4). The rod pieces 3a, 3b, 3c, 3d are coupled to each other with joints 8. The two intermediate rod pieces 3b, 3c have the same shape and the same length.

Each joint 8 has a hexagonal column shape, and has a through internal thread 9 along its central axis, and the internal thread 9 is engaged with the external threads 6 of the adjacent rod pieces 3a, 3b, 3c, 3d.

Specifically, a joint (tip joint) 8 located nearest the tip (upper end in FIG. 4) of the anchor bolt is threadably engaged with a base-end side of the external thread 6 of the tip rod piece 3a and threadbaly engaged with a tip-side external thread 6 of a first intermediate rod piece 3b which is one of the two intermediate rod pieces 3b, 3c nearer the tip (upper in FIG. 4) of the anchor bolt. A joint (intermediate joint) 8 located intermediate of the anchor bolt is threadably engaged with a base-end-side external thread 6 of the first intermediate rod piece 3b and threadably engaged with a tip-side external thread 6 of a second intermediate rod piece 3c which is one of the two intermediate rod pieces 3b, 3c nearer the base-end (lower in FIG. 4) of the anchor bolt. A joint (base-end joint) 8 located nearest the base end (lower end in FIG. 4) of the anchor bolt is threadably engaged with a base-end-side external thread 6 of the second intermediate rod piece 3c and threadably engaged with a tip side of the external thread 6 of the base-end rod piece 3d.

As shown in FIGS. 1-4, each expandable device 5 has a taper member 12 having a through internal thread 11 along its central axis, and an expandable member 13 fitted over the taper member 12, and the internal thread 11 of the taper members 12 is threadably engaged with the external thread 6 of the rod piece 3a, 3b, 3c, 3d of the rod 3.

Specifically, the taper member 12 of the expandable device (tip expandable device) 5a nearest the tip (left end in FIG. 1) is threadably engaged with the external thread 6 of the tip rod piece 3a. The taper member 12 of the expandable device (intermediate expandable device) 5b located at an intermediate location is threadably engaged with the base-end-side external thread 6 of the first intermediate rod piece 3b. The taper member 12 of the expandable device (base-end expandable device) 5c nearest the base end (right end in FIG. 1) is threadably engaged with the base-end-side external thread 6 of the second intermediate rod piece 3c.

Figure 2:
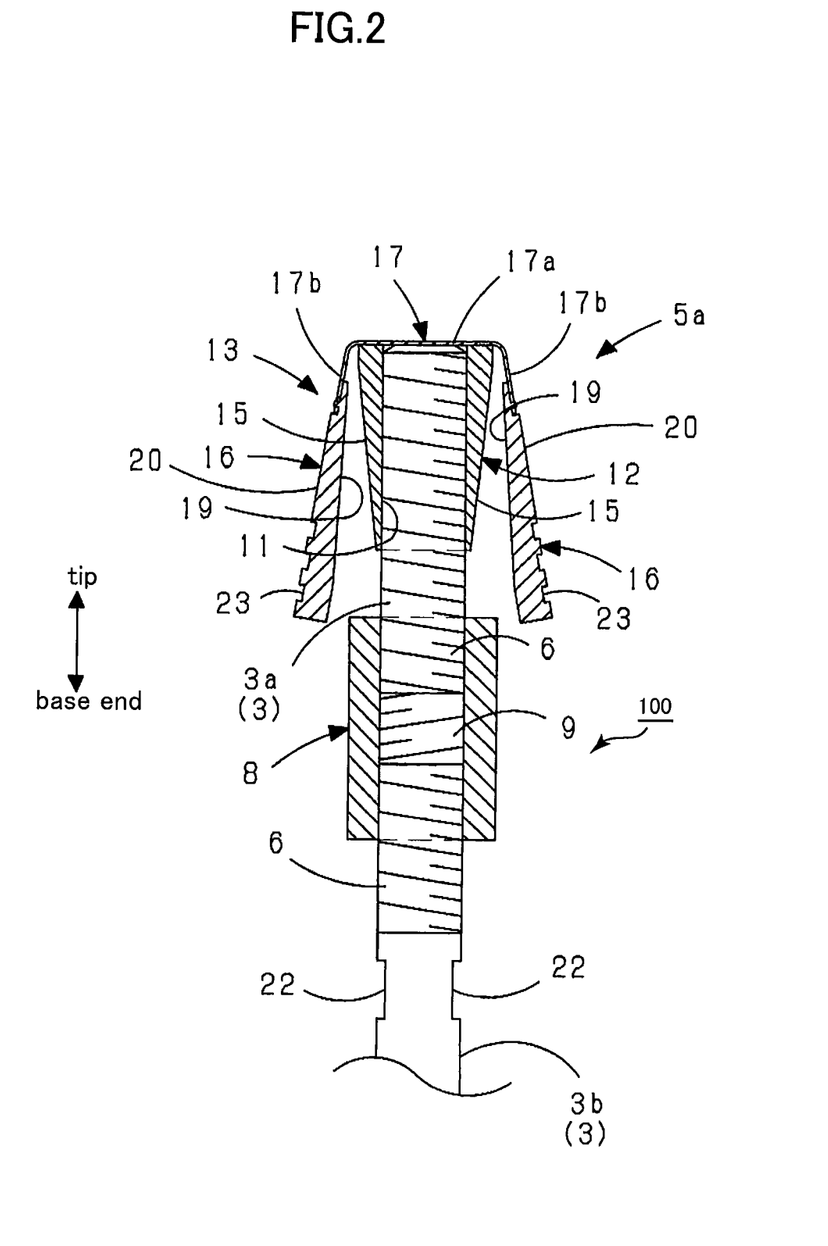
FIG. 2 is a longitudinal cross-sectional view of a tip of the first embodiment of the anchor bolt according to the present invention.

An outer peripheral surface of the taper member 12 has a cylindrical surface, and planer inclined surfaces 15 on four sides of the outer peripheral surface of the taper member 12 (see FIGS. 2 and 4). The inclined surfaces 15 on the four sides are equally spaced in a circumferential direction of the taper member 12. Each inclined surface 15 of the taper member 12 is inclined so as to come closer to the central axis of the taper member 12 toward the base end (downward in FIG. 4) of the anchor bolt.

Figure 3:
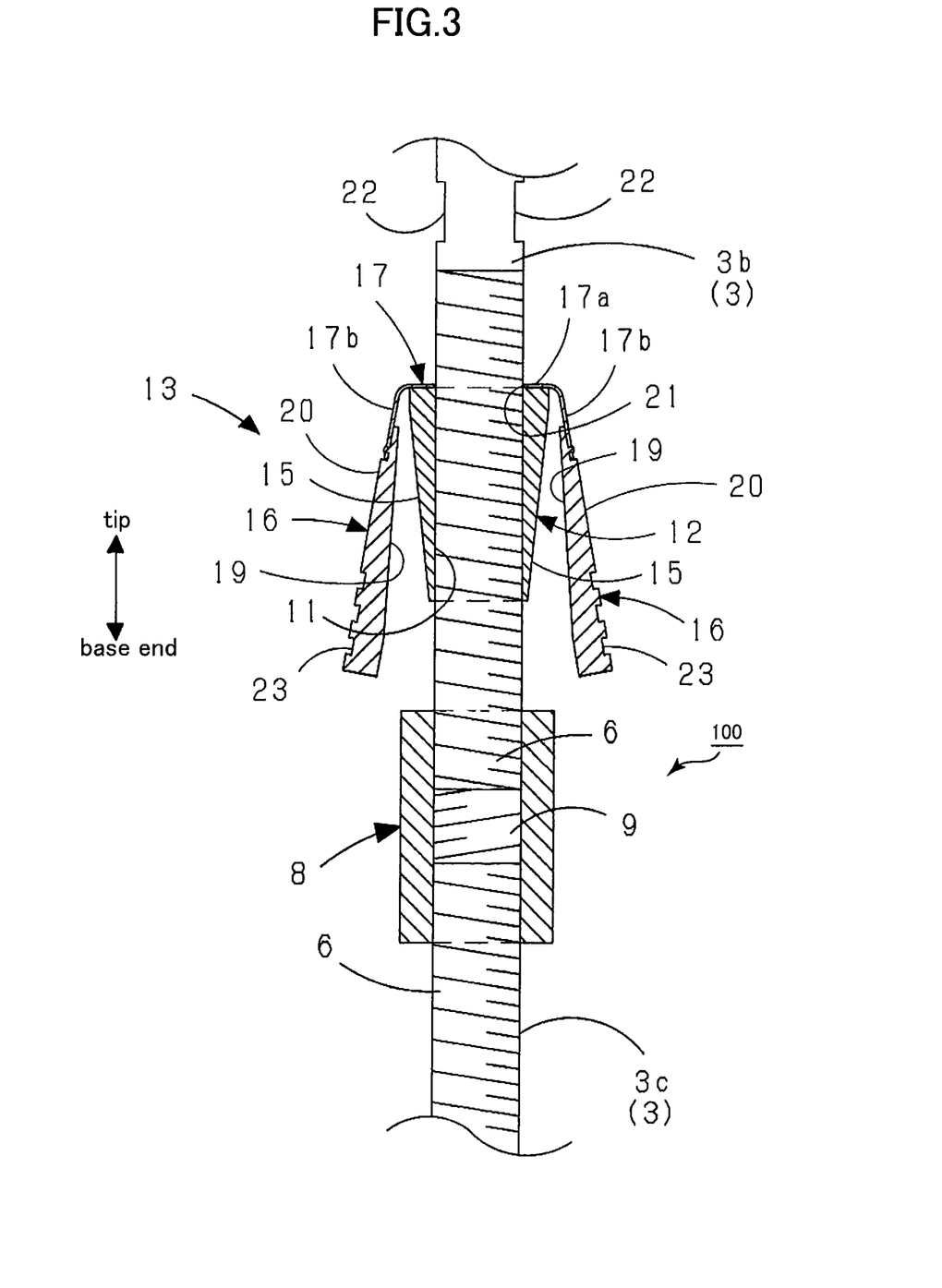
FIG. 3 is a longitudinal cross-sectional view of an intermediate portion of the first embodiment of the anchor bolt according to the present invention.

As shown in FIGS. 2 and 3, the expandable member 13 has four abutment parts 16 arranged so as to face respective inclined surfaces 15 of the taper member 12, and a bridge 17 connecting tips (upper side in FIG. 4) of the abutment parts 16 with each other. An inner surface 19 of each abutment part 16 of the expandable member 13 is planar, and is configured to be able to surface-contact (abut) each inclined surface 15 of the taper member 12.

Figure 5:
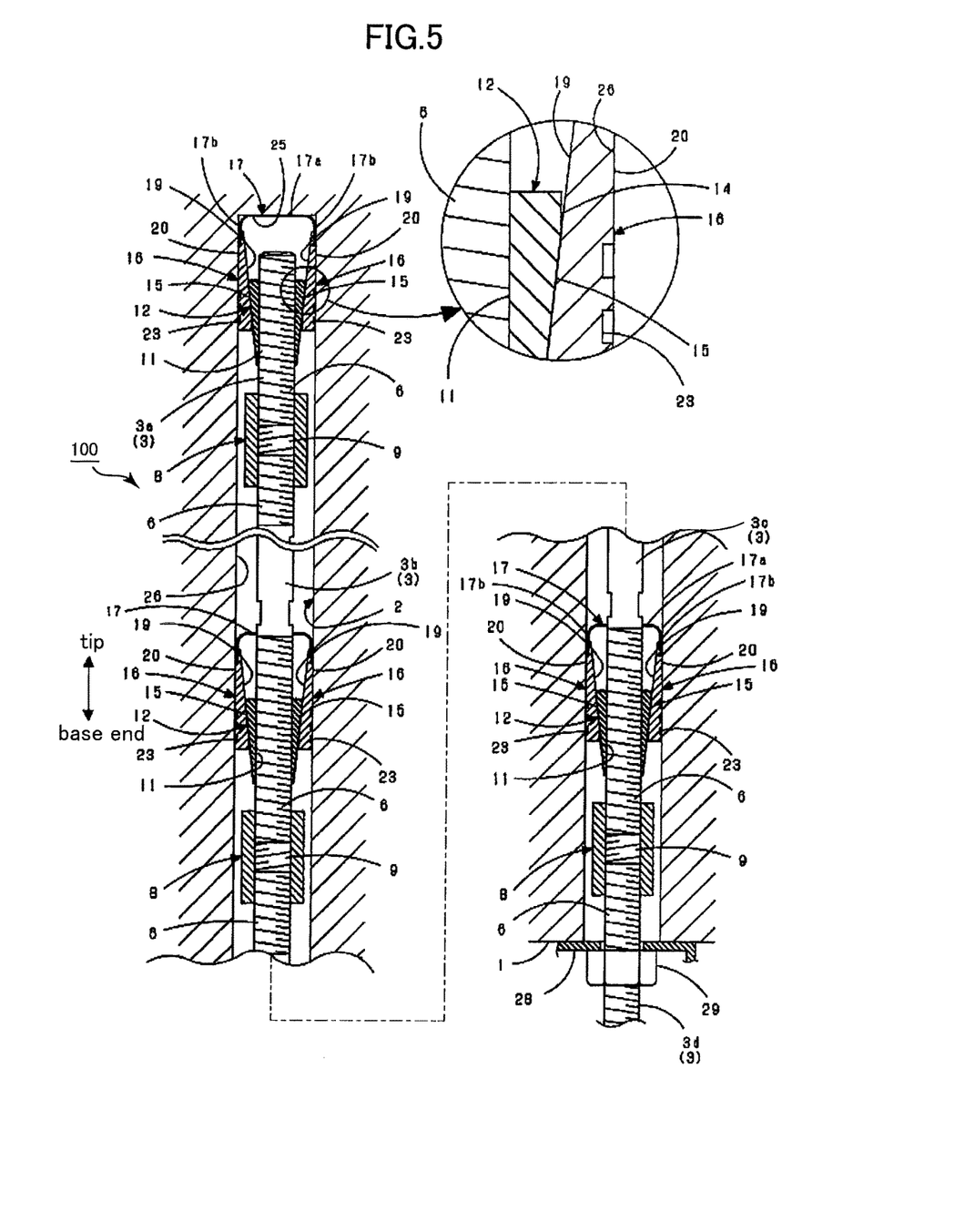
FIG. 5 is a longitudinal cross-sectional view of the first embodiment of the anchor bolt according to the present invention, for explaining a procedure of attaching the anchor bolt in a bore.

In a state in which the inner surface 19 of the abutment part 16 surface-contacts the inclined surface 15 of the taper member 12 (in a state shown in FIG. 6), the inner surface 19 is inclined so as to come closer to the central axis of the taper member 12 toward the base end (downward in FIG. 4) of the anchor bolt (see FIG. 5). An inclined angle of the inner surface 19 of each abutment part 16 of the expandable member 13 substantially equals to an inclined angle of each inclined surface 15 of the taper member 12.

An outer peripheral surface 20 of each abutment part 16 of the expandable member 13 is formed as a cylindrical surface, and is configured to be surface-pressed (namely, pressed in a surface-contacting state) or pushed against the inner peripheral surface 26 of the bore 2 (see FIG. 5).

The bridge 17 consists of a planar main body 17a located at a tip of the expandable device 5, and four planar connecting parts 17b connecting the main body 17a to the tip of each abutment part 16. Each abutment part 16 of the expandable member 13 is configured so as to go away from the rod 3 toward a free end (downward in FIGS. 2 and 3) of the abutment part 16e. Further, when the anchor bolt is inserted from its tip into the bore 2, the expandable member 13 is inserted into the bore 2 in a elastically deformed state and the free end of the abutment part 16 is pushed against the inner peripheral surface 26 of the bore 2. The main bodies 17a of the bridges 17 of the intermediate expandable device 5b and the base-end expandable device 5c have respective apertures 21 through which the intermediate rod pieces 3b, 3c pass.

A set of two cutouts 22, 22 for being engaged with a tool, such as a wrench (spanner), is provided at each end of the two intermediate rod pieces 3b, 3c and nearer the center than the external thread 6 in the longitudinal direction. The cutouts 22, 22 of each set are located symmetrically with respect to a central axis of the intermediate rod pieces 3b, 3c. Thus, when the intermediate rod pieces 3b, 3c are threadbaly engaged with the joint 8, the tool is engaged with the cutouts 22, 22 to turn, for example, the intermediate rod pieces 3b, 3c so that the intermediate rod pieces 3b, 3c can be threadably engaged with the internal threads 9 of the joints 8 easily.

Equipment items, lines and so on (not shown) are attached to the base end rod piece 3d. Each member of the anchor bolt is formed of, for example, stainless steel. A lower portion (base side) of the outer peripheral surface 20 of each abutment part 16 of the expandable member 13 is provided with a plurality of (three in the present embodiment) grooves 23 which are arranged next to each other and equally spaced in the longitudinal direction (up-down direction in FIGS. 2 and 3) of the abutment part 16, and the grooves 23 extend circumferentially on the outer peripheral surface 20 of each abutment part 8 (see FIG. 1). When the anchor bolt is inserted into the bore 2 as stated above, not only the free end of the abutment part 16, but also edges of the grooves 23 can get stuck on the inner peripheral surface 26 of the bore 2.

In this connection, the grooves 23 may be inclined with respect to the up-down direction on the outer peripheral surface 20 of the abutment part 8, and instead of or in addition to the grooves 23, the outer peripheral surface 20 of the abutment part 8 may be provided with protrusions (not shown). In order to prevent the joints 8 from being loosened with respect to the external threads 6 of the rod pieces 3a, 3b, 3c, 3d, the joints 8 may be anti-loosened, for example, with lock nuts (not shown).

Next, an example of a procedure of assembling the anchor bolt will be explained. Firstly, the taper member 12 of the tip expandable device 5a is threadably engaged with the external thread 6 of the tip rod piece 3a, and the expandable member 13 of the tip expandable device 5a is fitted over the taper member 12 of the tip expandable device 5a.

Further, the taper member 12 of the intermediate expandable device 5b is threadably engaged with the base-end-side external thread 6 of the first intermediate rod piece 3b, the first intermediate rod piece 3b is passed through the aperture 21 of the bridge 17 of the intermediate expandable device 5b, and the expandable member 13 of the intermediate expandable device 5b is fitted over the taper member 12 of the intermediate expandable device 5b. Further, the taper member 12 of the base-end expandable device 5c is threadably engaged with the base-end-side external thread 6 of the second intermediate rod piece 3c, the intermediate rod piece 3c is passed through the aperture 21 of the bridge 17 of the base-end expandable device 5c, and the expandable member 13 of the base-end expandable device 5c is fitted over the taper member 12 of the base-end expandable device 5c.

Then, the rod pieces 3a, 3b, 3c, 3d are coupled to each other with the joints 8 so that the assembly of the anchor bolt shown in FIG. 1 is completed.

The assembled anchor bolt is, for example, held by a hand of a worker in a state in which the tip expandable device 5a is oriented upward, and the anchor bolt is inserted into the bore 2 until the main body 17a of the bridge 17 of the tip expandable device 5a abuts an upper surface 25 of the bore 2 (see FIGS. 4 and 5).

Then, the rod 3 is pulled toward the base end (downward in FIG. 5) of the bore 2 (anchor bolt), so that the rod 3 and the taper member 12 of each expandable device 5 are lowered (moved) toward the base end of the bore 2 (anchor bolt). At that time, since each expandable member 13 is inserted into the bore 2 in the elastically deformed state and a free-end side (free end of the abutment part 16 and/or edges of the grooves 23) of each abutment parts 16 is pushed (got stuck) against the inner peripheral surface 26 of the bore 2 due to the elastic recovery force, the downward movement of each abutment part 16 (expandable member 13) is restricted, the abutment part 16 of the expandable member 13 is restricted from following the lower movement of the taper member 12 and being lowered, each inclined surface 15 can properly surface-contacts (namely, be pressed in a surface-contacting state against) the inner surface 19 of each abutment part 16, the inner surface 19 of each abutment part 16 is pushed toward the inner peripheral surface 26 of the bore 2 due to each inclined surface 15, and each abutment part 16 can be surely pushed toward the inner peripheral surface 26 of the bore 2 due to each inclined surface 15.

Thus, the outer peripheral surface 20 of each abutment part 16 is pressed against the inner peripheral surface 26 of the bore 2, namely, pressed in a surface-contacting state, and a friction between surfaces, namely, the outer peripheral surface 20 of each abutment part 16 and the inner peripheral surface 26 of the bore 2 allows the anchor bolt to be fixed (temporarily fixed) in the bore 2.

A bracket 28 (FIG. 5) for fixing facility items, lines and so on which are not shown is mounted to the external thread 6 of the base-end rod piece 3d of the anchor bolt, and a nut 29 (FIG. 5) is threadably engaged (mounted) with the external thread 6 under the bracket 28. Then, the nut 29 is turned (fastened) with a tool, such as a wrench (spanner), and the nut 29 is pressed against portions around a lower edge of the bore 2 via the bracket 28. The nut 29 is further turned so that the rod 3 is further pulled downward due to the nut 29, and the rod 3 and the taper member 12 of each expandable device 5 are further lowered toward the base end of the bore 2.

Thus, the inner surface 19 of each abutment part 16 is further pushed (in a surface-pressed state) toward the inner peripheral surface 26 of the bore 2 by each inclined surface 15 of the taper member 12, the outer peripheral surface 20 of each abutment part 16 is strongly surface-pressed (pressed) against the inner peripheral surface 26 of the bore 2, the anchor bolt is fixed in the bore 2 more firmly, and the anchor bolt is surely prevented from being removed from the bore 2. In this connection, instead of the bracket 28, a washer (not shown) may be mounted on the nut 29.

Even if the rod 3 of the anchor bolt which is fixed in the bore 2 is pulled downward by a weight of the facility item and so on (external force), since the taper member 12 follows this pulling to strongly press the inner surface 19 of each abutment part 16, the outer peripheral surface 20 of each abutment part 16 is strongly surface-pressed (pressed) against the inner peripheral surface 26 of the bore 2. Thus, the anchor bolt can be surely prevented from being removed from the bore 2.

Figure 6:
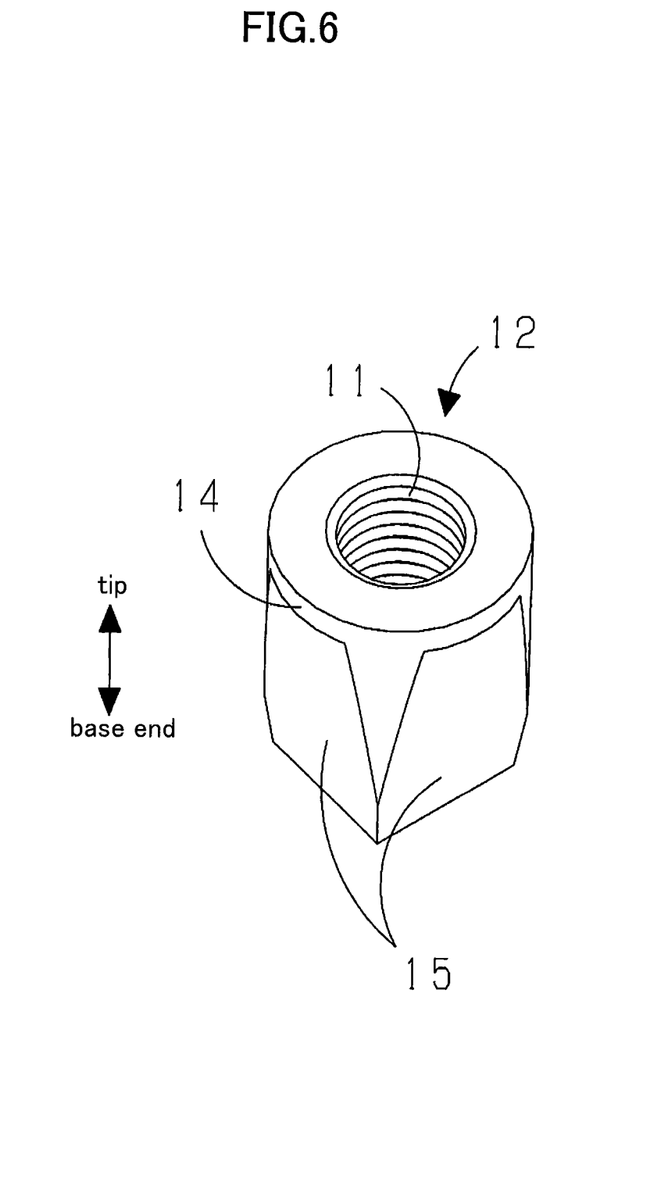
FIG. 6 is a perspective view of taper member of a second embodiment of an anchor bolt according to the present invention.

As shown in FIG. 6, in a taper member in a second embodiment of the anchor bolt, an inclined surface 15 of the taper member 12 is not formed to a tip (upper end in FIG. 6) of the taper member 12 and an outer peripheral surface of the tip of the taper member 12 is a cylindrical surface. Namely, the outer peripheral surface (tip peripheral surface) 14 of the tip of the taper member 12 located upper than the inclined surface 15 defines an upright surface along the central axis of the taper member 12, which is circumferentially curved.

Thus, the tip of the taper member 12 is difficult to contact the inner surface 19 of the abutment part 16 (see FIG. 6), a thickness (up-down direction in FIG. 6) of an edge portion of the tip of the taper member 12 becomes large, and to the extent of this, the edge portion of the tip of the taper member 12 is difficult to be deflected (deformed).

Further, in the expandable member, it is preferable that each connecting part 17b of the bridge 17 extends from an edge of the main body 17a toward the base end of the anchor bolt, and the tip of the abutment part 16 is fixed to a free end of the connecting part 17b. It is preferable that the main body 17a and each connecting part 17b of the bridge 17 are integrally formed and are elastically deformable.

For example, by standing a lateral swage pin on a tip side of the abutment part 16, forming an aperture on the free end of the connecting part 17b of the bridge 17, passing the swage pin through the aperture of the connecting part 17b, and swaging the swage pin, the abutment part 16 can be fixed to the connecting part 17b. In this connection, the abutment part 16 may be fixed to the connecting part 17b by using a rivet, a screw or spot welding.

When the anchor bolt is inserted from its tip into the bore 2, the anchor bolt enters the bore 2 in a state in which the bridge 17 of the expandable member 13 is elastically deformed, the free end of the abutment part 16 comes closer to the taper member 12 (see FIG. 5), and due to the elastic recovery force, the free end of the abutment part 16 is pushed against the inner peripheral surface 2 of the bore 2. The main body 17a of each bridge 17 of the intermediate expandable device 5b and the base-end expandable device 5c is provided with an aperture 21 (FIG. 3), through which the intermediate rod pieces 3b, 3c are passed.

Then, when the taper member 12 is moved toward the base end of the anchor bolt due to the screw action, for example, by turning the rod 3, the inner surface 19 of each abutment part 16 is further pressed in the surface-pressed state toward the inner peripheral surface 26 of the bore 2 due to each inclined surface 15 of the taper member 12, the outer peripheral surface 20 of each abutment part 16 is strongly pressed against the inner peripheral surface 26 of the bore 2, and the anchor bolt is fixed in the bore 2 more firmly.

Then, the nut 29 is fastened with a tool, such as a wrench (spanner), to attach the bracket 28 to the anchor bolt.

In this connection, when the nut 29 is fastened, the rod 3 is further pulled downward, and the rod 3 and the taper member 12 of each expandable device 5 are further lowered toward the base end of the bore 2.

In the above-stated embodiment, the rod 3 is divided into four rod pieces 3a, 3b, 3c, 3d, and three expandable devices 5 are disposed on the rod 3, but the rod 3 may be divided into two, three, five or more, and two, four or more expandable devices 5 may be disposed on the rod 3.

In the above-stated embodiment, four abutment parts 16 are disposed in the expandable member 13 of each expandable device 5, but, for example, only two abutment parts 16 may be disposed. In this case, for example, only two inclined surfaces 15 may be formed in the taper member 12. Further, three abutment parts 16 may be disposed in a circumferential direction of the taper member 12. In this case, three inclined surfaces 15 may be formed in the taper member 12.

In this way, since the number of the expandable devices 5 which are inserted into the bore 2 along with the rod 3 is three, contact areas between the abutment part 16 of the expandable member 13 and the inner peripheral surface 26 of the bore 2 can be increased more than that when only one expandable device 5 is disposed on the rod 3, and to the extent of this, the anchor bolt can be surely fixed in the bore 2.

Further, the planar inclined surface 15 of the taper member 12 surface-contacts the planar inner surface 19 of the abutment part 16, so that the taper member 12 is prevented from being relatively turned with respect to the abutment part 16 circumferentially. Namely, when the anchor bolt is inserted into the bore 2, the abutment part 16 is held on the inner peripheral surface 26 of the bore 2 and the circumferential turning of the taper member 12 is restricted by the abutment part 16, so that even if the rod 3 is turned, the taper member 12 is prevented from following the turning of the rod 3. Thus, when the rod 3 is turned, the taper member 12 is moved (lowered) only in an axial direction so that the inner surface 19 of each abutment part 16 is surely pushed toward the inner peripheral surface 26 of the bore 2 with each inclined surface 15 of the taper member 12.

In this connection, the inclined surface 15 of the taper member 12 and the inner surface 19 of the abutment part 16 may be slightly curved surfaces so long as the abutment part 16 prevents the taper member 12 from being circumferentially turned.

Since the tip peripheral surface 14 of the taper member 12 defines the upright surface along the central axis of the taper member 12, the tip of the taper member 12 is difficult to contact the inner surface 19 of the abutment part 16, and the edge portion of the tip of the taper member 12 does not become thin. Thus, even if the taper member 12 and the inner surface 19 of the abutment part 16 are frictioned each other due to the movement of the taper member 12 toward the base end of the anchor bolt, the edge portion of the tip of the taper member 12 can be restricted from being deflected toward the tip of the anchor bolt. To the extent of this, the stress (deformation) of the taper member 12 can be restricted, the inclined surface 15 of the taper member 12 is properly surface-pressed against the inner surface 19 of the abutment part 16, and the abutment part 16 can be sufficiently pushed toward the inner peripheral surface 26 of the bore 2 by the taper member 12.

EXPLANATIONS OF REFERENCE NUMERALS

1: wall surface
2: bore
3: rod
3a, 3b, 3c, 3d: rod piece
5: expandable device
6: external thread of rod piece
8: joint
11: internal thread of taper member
12: taper member
13: expandable member
14: upright surface of taper member
15: inclined surface of taper member
16: abutment part
17: bridge
17a: body of bridge
17b: connecting portion of bridge
19: inner surface of abutment part
20: outer peripheral surface of abutment part
21: cutout of rod piece
26: inner peripheral surface of bore

What is claimed:
1. An anchor bolt fixed in a bore provided in a wall surface, comprising:
  a cylindrical rod having on its outer peripheral surface an external thread, and
  an expandable device disposed on the rod for fixing the anchor bolt on an inner peripheral surface of the bore;
  wherein the expandable device has a taper member and an expandable member fitted over the taper member, the taper member having an internal thread formed along a central axis of the taper member for being threadably engaged with the external thread of the rod and a plurality of planar inclined surfaces of an outer peripheral surface of the taper member,
  wherein the expandable member has a plurality of abutment parts and a bridge connecting tips of the abutment parts with each other, the abutment part having a planar inner surface which can surface-contact the inclined surface of the taper member, wherein each inclined surface of the taper member is inclined so as to go away from the central axis of the taper member toward a tip of the anchor bolt, wherein the tip of the taper member has a tip peripheral surface which is located adjacent to and on the tip side of the inclined surface and is formed as an upright surface along the central axis of the taper member, wherein when the taper member is moved toward a base end of the bore in a state in which the anchor bolt is inserted into the bore, the inclined surface of the taper member is surface-pressed against the inner surface of the abutment part and an outer peripheral surface of the abutment part is pressed against the inner peripheral surface of the bore; and wherein a portion of the inner surface of the abutment part is located closer to the tip of the anchor bolt than the inclined surface of the taper member.

2. The anchor bolt according to claim 1, wherein the rod is divided into a plurality of rod pieces, each rod piece having an external thread on at least a portion along a longitudinal direction of the rod piece, wherein the rod pieces are coupled to each other with a joint, and wherein the external threads of at least two of the rod pieces are threadably engaged with the taper member of the expandable device.

3. The anchor bolt according to claim 1, wherein the abutment part of the expandable member is configured so as to go away from the rod toward a free end of the abutment part, and wherein when the anchor bolt is inserted into the bore, the expandable member is inserted into the bore in an elastically deformed state and the free end of the abutment part is pushed against the inner peripheral surface of the bore due to an elastic recovery force.

4. The anchor bolt according to claim 1, wherein the bridge consists of a main body located at a tip of the expandable device, and a plurality of connecting parts connecting the main body to the tip of each abutment part, the main body and the connecting parts being integrally formed, wherein at least each connecting part of the bridge is elastically deformable.

5. The anchor bolt according to claim 1, wherein the expandable device includes at least two expandable devices which are independent with respect to each other.

6. The anchor bolt according to claim 1, wherein a length of the tip peripheral surface along the central axis is 1-10 mm.

7. The anchor bolt according to claim 2, wherein the abutment part of the expandable member is configured so as to go away from the rod toward a free end of the abutment part, and wherein when the anchor bolt is inserted into the bore, the expandable member is inserted into the bore in an elastically deformed state and the free end of the abutment part is pushed against the inner peripheral surface of the bore due to an elastically recovery force.

8. The anchor bolt according to claim 2, wherein the bridge consists of a main body located at a tip of the expandable device, and a plurality of connecting parts connecting the main body to the tip of each abutment part, the main body and the connecting parts being integrally formed, wherein at least each connecting part of the bridge is elastically deformable.

9. The anchor bolt according to claim 5, wherein the rod is divided into a plurality of rod pieces, each rod piece having an external thread on at least a portion along a longitudinal direction of the rod piece, wherein the rod pieces are coupled to each other with a joint, and wherein the external threads of at least two of the rod pieces are threadably engaged with the taper members of the respective expandable devices.

* * * * *